United States Patent [19]

Miyagi

[11] Patent Number: 4,641,199
[45] Date of Patent: Feb. 3, 1987

[54] IMAGE READING APPARATUS

[75] Inventor: Ken Miyagi, Yokohama, Japan

[73] Assignee: Canon Kabushiki Kaisha, Tokyo, Japan

[21] Appl. No.: 533,958

[22] Filed: Sep. 20, 1983

[30] Foreign Application Priority Data

Sep. 29, 1982 [JP] Japan ................................ 57-170636

[51] Int. Cl.$^4$ ......................... H04N 1/04; H04N 1/40
[52] U.S. Cl. ................................... 358/285; 358/293;
358/294; 250/578; 356/401
[58] Field of Search ........................... 250/578, 237 G;
356/401; 358/212, 213, 293, 294, 285, 264;
355/7; 382/44, 45

[56] References Cited

U.S. PATENT DOCUMENTS 4,256,959  3/1981  Monette ............................... 358/285
4,318,135  3/1982  Allis et al. .......................... 358/293
4,337,394  6/1982  Fukushima ......................... 250/578

Primary Examiner—James J. Groody
Assistant Examiner—John K. Peng
Attorney, Agent, or Firm—Fitzpatrick, Cella, Harper & Scinto

[57] ABSTRACT

An image reading apparatus with plural linear image sensors arranged along the main scanning direction, in which plural markers positioned outside the image area are simultaneously read by the image sensors for facilitating the alignment of the image sensors.

6 Claims, 10 Drawing Figures

IMAGE READING APPARATUS

BACKGROUND OF THE INVENTION

1. Field of the Invention

The present invention relates to an image reading apparatus adapted for use in a digital copier, a facsimile, an electronic file or the like, and more particularly to the positional adjustment of linear sensors performing image reading operation by relative movement with respect to the original image to be read.

2. Description of the Prior Art

The image sensor for reading image information for example in a digital copier, a facsimile or the like is often composed of CCD (charge-coupled device) line sensors. This is because the CCD line sensor is most suitable in the present technology for obtaining maximum the number of cells for converting the image information into electric signals. In order to improve the resolving power and to increase the signal transmission rate, there is proposed, for example in the U.S. Pat. No. 4,459,619, issued July 10, 1984 to T. Yoshida and assigned in common with the present application, an image reading apparatus in which plural CCD's are arranged along the main scanning direction.

The image reading apparatus utilizing the photoelectric converting elements as explained above does not require one-to-one projection as in the conventional copier in which the light reflected from the original is guided optically to a photosensitive member for exposure, because the CCD image sensor is composed of a semiconductor device containing a plurality of photoelectric converting cells on a small chip, and various advantages are derived from this fact. On the other hand, it is required to reduce the image of the original to the photosensitive area of the CCD image sensor, so that the mounting precision of the CCD image sensor has to be exactly controlled at least proportional to the reduction ratio. Also in the case that plural CCD image sensors are employed, it is required not only to position each image sensor in relation to the corresponding image position on the original but also to align the image sensors without superposition, skipping or bending so that the image reading with plural image sensors can be conducted as if it is done with a single image sensor.

For the purpose of adjusting the mounting positions of such CCD image sensors, there has been proposed a method of reading, prior to the start of original scanning, a black marker line which is provided outside the subsidiary scanning range (in FIG. 1B, outside the original 2 in the direction Y) and at the center in the main scanning direction (direction X in FIG. 1B) and mechanically adjusting the mounting position of the CCD image sensors in such a manner that the black level signal corresponding to said marker line occurs at a determined signal position, or taking out the effective signals alone from the output signals of the CCD image sensors, utilizing said marker line signal as the reference signal and storing said effective signal in a memory. More specifically, in case two CCD's are arranged along the main scanning direction and are moved in the subsidiary scanning direction to read the entire area of the original, in which the main scanning line is equally shared by two CCD's, a marker composed a black line of several millimeters wide is provided outside the subsidiary scanning area and at the center in the main scanning direction, and the CCD image sensors are arranged in such a manner that the photosensitive areas thereof partially overlap each other.

In such an arrangement, the positioning of the CCD image sensors is conducted in the following manner. At first it is necessary to adjust the longitudinal position, in the main scanning direction, of the CCD image sensors, for example by mechanical adjustment or optical projection, since the marker at the center in the main scanning direction assures the sensor position at said central position but not necessarily at the end positions. Then, prior to the original scanning, an area including the marker is illuminated by a light source to obtain serial electric signals from the first and second CCD's. Since the marker is positioned at the center in the main scanning direction, a signal corresponding to said marker appears at the rear end, or in the vicinity thereof, in the electric signals from one CCD and at the leading end, or in the vicinity thereof, in the electric signals from the other CCD. The width of said black marker line can be correlated in advance with the duration of the output signal from CCD. Consequently the positioning in the main scanning direction can be achieved by displacing the CCD's in said direction in such a manner that the portions of said black marker signal respective in the output signals of the CCD's are equal in duration.

The above-described conventional image reading apparatus in which the marker is provided at the center in the main scanning direction for positioning the CCD's has, however, been associated with the following drawbacks. Firstly, such a central marker is useless for confirming the parallel arrangement of CCD's in the main scanning direction, so that the positioning of the CCD's has to be made without relying on the marker and is quite time consuming. Secondly, in the case that three or more CCD's are arranged along the main scanning direction in order to further improve the resolving power, the positioning is even more tedious since the positional precision and the degree of parallel arrangement have to be improved proportional to the resolving power.

SUMMARY OF THE INVENTION

In consideration of the foregoing, the object of the present invention is to provide an image reading apparatus with plural information reading sensors arranged along the main scanning direction, in which the parallel positioning and the positioning in the main scanning direction of said plural information reading sensors can be precisely achieved with a simple procedure.

Another object of the present invention is to provide an image reading apparatus capable of automatic electric adjustment with respect to the positioning of sensors in the main scanning direction.

The foregoing and still other objects of the present invention will become fully apparent from the following description.

DETAILED DESCRIPTION OF THE PREFERRED EMBODIMENTS

Now the present invention will be clarified in detail by reference to an embodiment of the image reading apparatus shown in the attached drawings. The following description describes the arrangement of markers for position adjustment, the signal processing unit, and first and second position adjusting methods for the image reading sensors, in this order.

The image to be read by the reading apparatus of the present embodiment includes information in documents, photographs, maps and charts containing characters, symbols and other images, and also information in patterns on planar objects such as textiles and fiber products. In the present text the substrate bearing such information thereon shall be referred to as an original.

At first there will be given an explanation on the arrangement of markers in the image reading apparatus embodying the present invention.

Figure 1A:
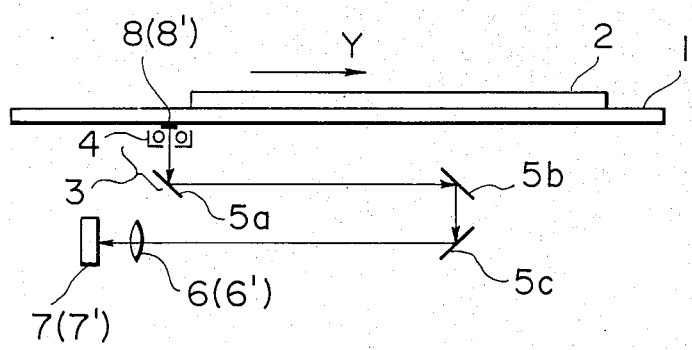
FIG. 1A is a cross-sectional view of an optical system for use in an image reading apparatus embodying the present invention.
Figure 1B:
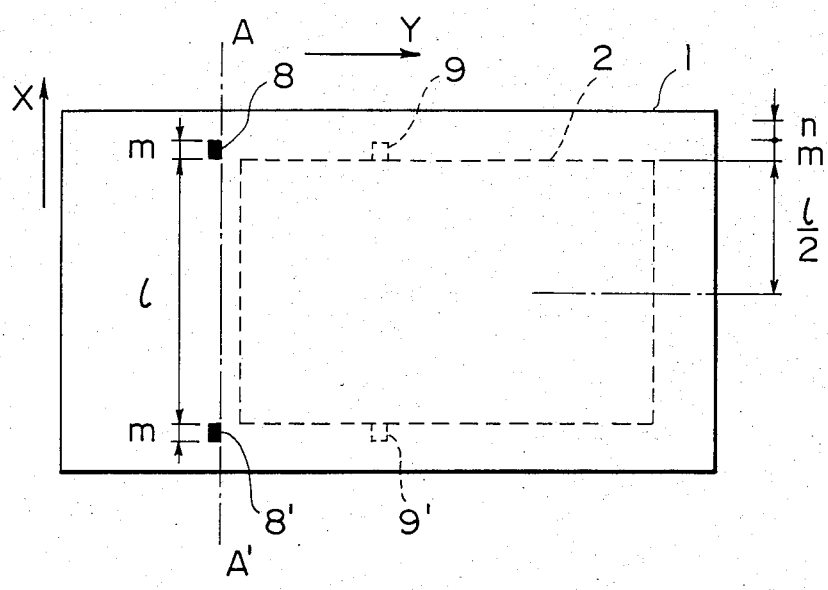
FIG. 1B is a plan view, seen from below, of an original carriage shown in FIG. 1A.

FIG. 1A is a cross-sectional view of an optical system for use in the image reading apparatus of the present invention, while FIG. 1B is a plan view seen from below of an original carriage 1 shown in FIG. 1A, both showing an embodiment in which two CCD (charge-coupled device) image sensors are arranged along the main scanning direction. In these figures, the original carriage 1 supports an original with the face to be read downwards at an original position 2, and is made of a transparent material at least in the area supporting said original. A scanning unit 3 is principally composed of a light source 4 including a rodshaped light source such as a fluorescent lamp and a mirror 5a and is constructed to be movable in a direction Y, for example along unrepresented guide rails. Other mirrors 5b, 5c are rendered movable also in said direction Y along unrepresented guide rails at a speed equal to half of the moving speed of the scanning unit 3. There are also provided imaging lenses 6, 6' and CCD image sensors 7, 7'. X represents the main scanning direction of the CCD image sensors while Y represents the subsidiary scanning direction thereof. The scanning in said direction X is performed by electric scanning in the CCD image sensors, and that in said direction Y is achieved by the displacement of the scanning unit 3. In the above-described structure the original placed at the position 2 is illuminated by the light from the light source 4, and the reflected light is guided through mirrors 5a–5c and lenses 6, 6' and received by the CCD image sensors 7, 7' for conversion into electric signals corresponding to the intensity of the reflected light. The information over the entire surface of the original is read in succession by the displacement of the scanning unit 3 in the direction Y. Since the moving speeds of the scanning unit 3 and of the mirrors 5b, 5c have the aforementioned ratio, the distance from the illuminated position of the original to the lens 6 or 6' remains constant regardless of the position of the scanning unit 3 on the direction Y.

Markers 8, 8' are made of colored, for example black, belt-shaped prints or tapes and are provided in positions not affecting the original reading, namely outside the main scanning range and outside the subsidiary scanning range for original reading. In the present embodiment they are provided on the lower face of the original carriage 1, and aligned along a line A–A' in the main scanning direction X, with a determined distance 1 for each other. A numerical example of dimensions consists of $l=298$ mm, $m=2$ mm and $n=5$ mm, wherein m is the width of the markers in the direction X and n is the width of the margin outside the marker. When the main scanning operation is conducted in the CCD image sensors 7, 7' along the line A–A', a signal corresponding to the marker 8 appears at the front end of the output signals from the CCD 7, and a signal corresponding to the marker 8' appears at the rear end of the output signals from the other CCD 7', as shown by (b) and (c) in FIG. 3.

The markers 8, 8' are preferably provided, in the subsidiary scanning direction Y in FIG. 1B, at a home position of the scanning unit 3. The scanning unit 3 illuminates the markers at said home position for positional adjustment of the CCD's 7, 7' as will be explained later, then moves to the direction Y for scanning the original and finally returns to the home position, thus completing a single sequence of the positional adjustment of CCD's and of the original scanning.

Now there will be given an explanation of the signal processing unit, while making reference to FIGS. 2 and 3.

Figure 2A:
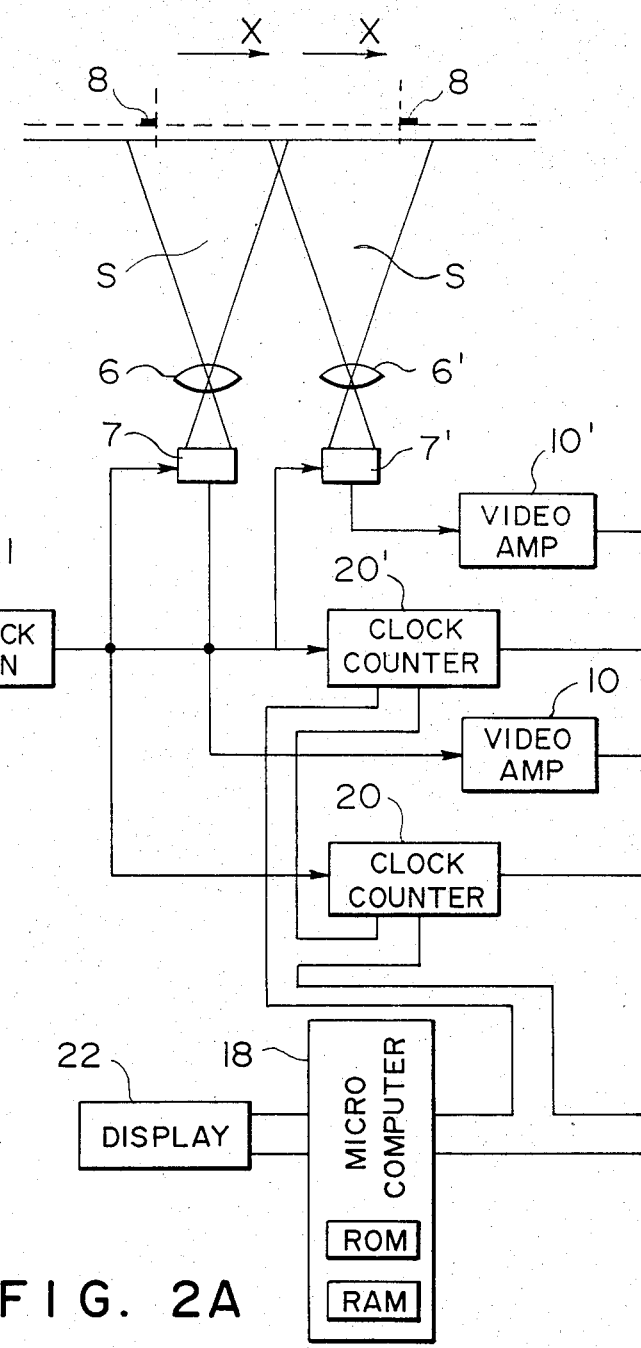
FIG. 2, composed of FIGS. 2A, 2B and 2C is a block diagram of a signal processing unit for use in the image reading apparatus of the present invention.
Figure 2:
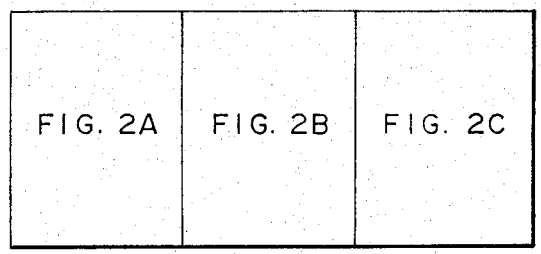
Figure 2B:
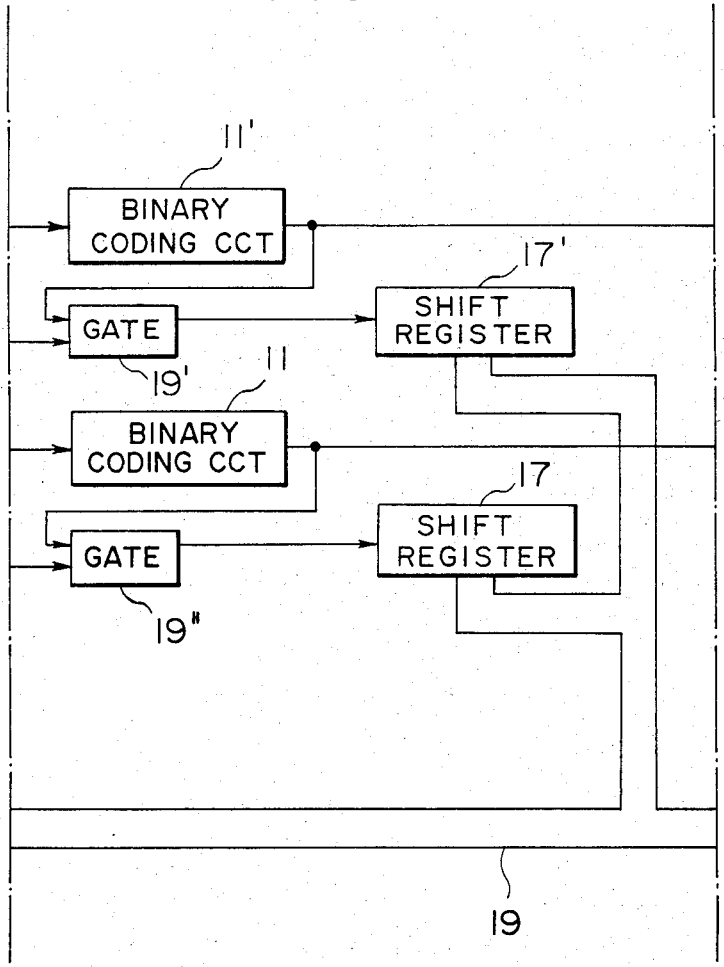
Figure 2C:
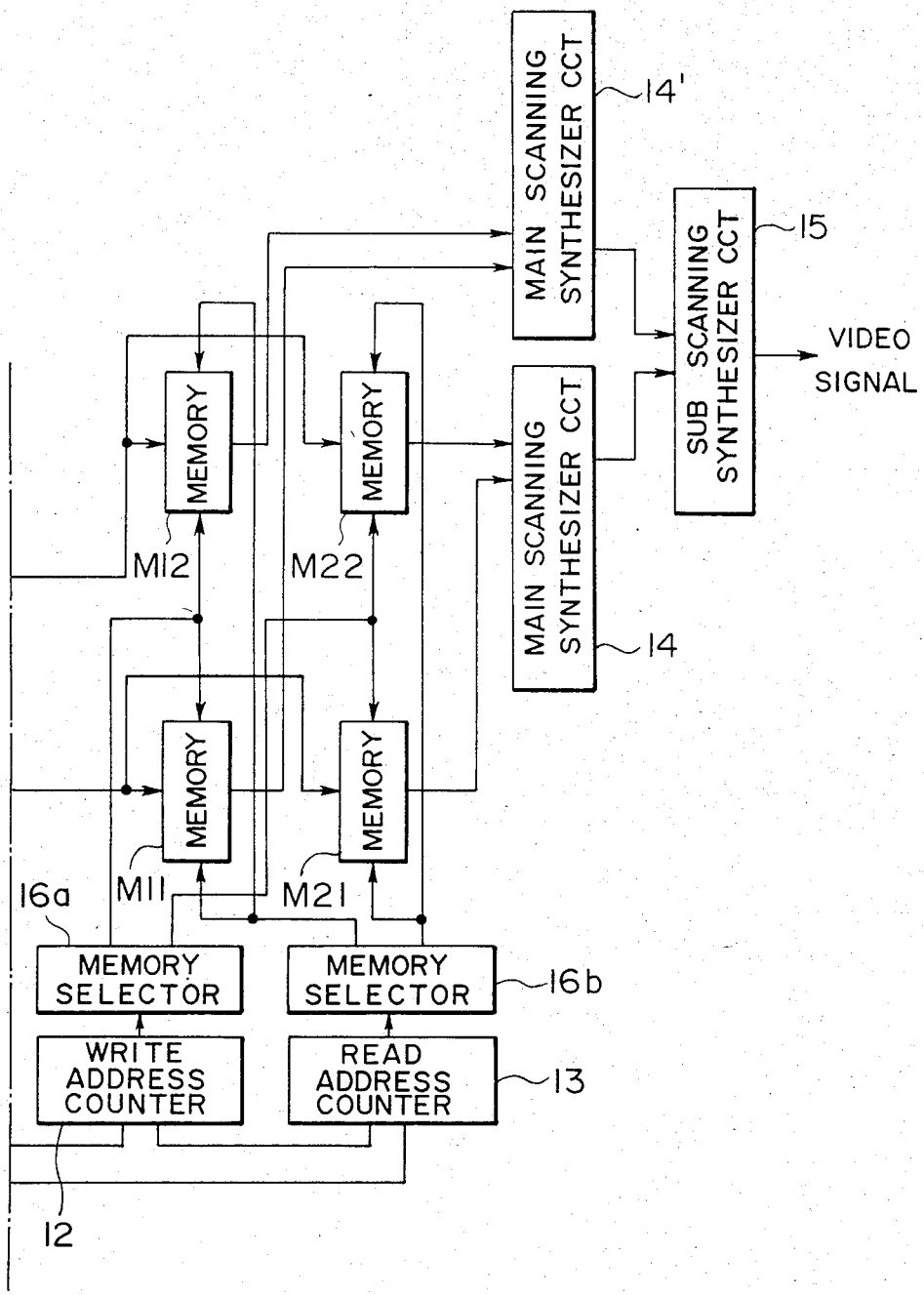

FIG. 2 shows a processing unit for the output signals from the CCD image sensors 7, 7' in particular relation to the processing of the signals corresponding to the markers 8, 8', said processing being controlled by a microcomputer 18 composed for example of a device MC6805 supplied by Motorola. The light emerging from the original is divided into halves approximately from the center of the original and guided through the lenses 6, 6' to the CCD's 7, 7'. The markers 8, 8' are positioned outside the main scanning range as already explained before. The CCD's 7, 7' are assumed to effect the main scanning operation in the direction X shown in FIG. 2. Consequently the signal corresponding to the marker 8 appears at the front end of the output signals from the CCD 7, and the signal corresponding to the marker 8' appears at the rear end of the output signals from the CCD 7'.

The output signals from the CCD's 7, 7' are respectively amplified in video amplifiers 10, 10' and converted into digital signals by binary encoding circuits 11, 11' including analog-to-digital converters. Said binary encoding circuits 11, 11' detect the level of the input video signals and release a signal "1" or "0" respectively in response to the black or white level of the light reflected from the original. A multi-level output containing intermediate tone may also be obtained by extracting output signals of plural bits from the analog-to-digital converter followed by dither processing.

The digitized output signals of the CCD image sensors are stored in two pairs of memories, at first in memories M11, M12 in parallel manner, then in memories M21, M22 in parallel manner, thus alternating at each main scanning operation. The address of the video signal in said memories is controlled by a write-address counter 12. The starting address is determined in relation to a horizontal synchronization signal synchronized with the transfer clock signals of the CCD's.

In synchronization with the start of signal storage into the memories M11, M12, the content of at first the memory M21 and then of the memory M22 is read in succession under the control of a main scanning synthesizer circuit 14 and released in continuous manner as video signals of a line through a subsidiary scanning synthesizer circuit 15. The start address of signal readout from the memories is controlled by a read-address counter 13, in synchronization with the aforementioned horizontal synchronization signal and with the readout clock signals is a similar manner as in the signal storage. Memory selectors 16a, 16b select the memories for signal storage and signal readout, and repeatedly perform selecting operations in the determined manner once the original reading operation is started.

The above-described procedure is repeatedfor every main scanning line. When the main scanning moves to a succeeding line, the output signals from the CCD's are stored in parallel manner into the memories M21, M22, and the contents of the memories M11, M12 are released in synchronization as video signals through a main scanning synthesizer circuit 14' and the subsidiary scanning synthesizer circuit 15.

Figure 3:
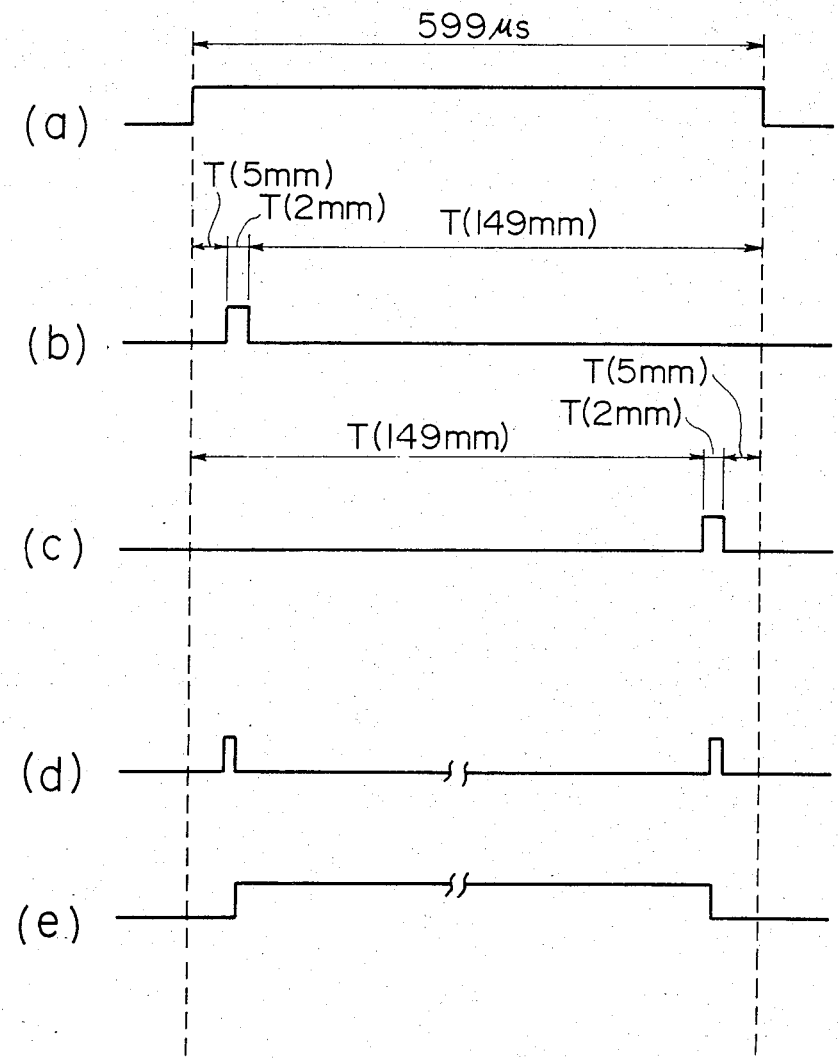
FIG. 3 is a timing chart showing signals in the signal processing unit shown in FIG. 2.

FIG. 3 shows the function timings in the signal processing unit shown in FIG. 2, wherein (a) represents the entire period of video signals from the CCD 7 or 7', corresponding to the reading range S shown in FIG. 2. Consequently, in case each CCD reads a range of 156 mm on the original with a resolving power of 16 bits/mm while the original to be read has a width of 298 mm (see FIG. 1B), the signals in said period have 2496 bits. If the interval of the clock signals for driving the CCD's is equal to 240 ns, the duration of said signal period is equal to 240 ns×2496=599 μs. The markers 8 and 8' are spaced by the aforementioned distance l which is equal to the width of the original (298 mm) and have a width m of 2 mm in the direction X and a width of several millimeters in the subsidiary scanning direction Y. The duration of the digitized signals from CCD 7 shown in FIG. 3 (b) corresponds to a total length of 156 mm, including the marker width m (2 mm), margin n for adjustment in the main scanning direction (5 mm) and effective reading range 1/2 (149 mm) (See FIG. 1B). The same applies to the digitized signals from the CCD 7' shown in FIG. 3(c). (d) shows the signals of a line synthesized from the output signals of the CCD's 7 and 7' in a different time scale, and (e) represents video signals required for constructing final image signals to be explained later.

Now there will be given an explanation of a first method of adjusting the mounting positions of the image sensors, while making reference to FIGS. 1 to 3. This method is used for adjusting the mounting positions of the CCD image sensors arranged as shown in FIGS. 1 and 2, under the observation of the video signals therefrom on a suitable display unit such as a synchroscope.

Firstly, in order to adjust the position of CCD's in the subsidiary scanning direction, the scanning unit 3 is positioned at the line A-A' shown in FIG. 1B so as to detect the edges of the markers 8, 8'. Said adjustment is effected under the observation of the digitized signals from the CCD's 7, 7' on a synchroscope. More detailedly, at first the CCD 7 is adjusted in such a manner that the digitized signals are obtained at the edge of the marker. Also in order to adjust the alignment of the CCD's, the CCD is adjusted in the horizontal direction in such a manner that the width of black level of the digitized signals corresponds to the determined number of bits. In the foregoing example, the black level signal should be present for 32 bits or 240 ns×32 in time, since the marker is 2 mm wide. Even if the marker is inclined, the black level signal can be satisfactorily obtained despite the light intensity change resulting from such inclination, as long as the signal level is sufficiently higher than the slicing level in the binary encoding circuit 11. Then the position of the CCD 7' in the subsidiary scanning direction is similarly adjusted in such a manner that the digitized signals shown in FIG. 3 (c) can be obtained at the edge of the marker. In this manner the CCD's 7 and 7' are so positioned as to read the same line. The above-described method enables the positional adjustment of CCD's in the subsidiary scanning direction under the waveform observation on a synchroscope, thus allowing faster and securer positional adjustment than the conventional method relying solely on the mechanical dimensions.

Secondly, in order to achieve positional adjustment in the main scanning direction, the scanning unit 3 is positioned at the center of the black marker 8, 8' and the light source 4 is activated. Since the distance between the internal edges of said markers 8, 8' is determined as 298 mm, the first CCD 7 is moved in the main scanning direction in such a manner that white signals of 5 mm, black mark signals of 2 mm and effective image signals of 149 mm can be obtained from the leading end of the video signal section (FIG. 3 (a) and (b)). This adjustment can be achieved, under the observation of the digitized signals on a synchroscope, in such a manner as to obtain 80 bits (80×240 ns), 32 bits (32×240 ns) and 2384 bits (2384×240 ns) in succession. Then the second CCD 7' is similarly displaced in the main scanning direction so as to obtain the effective image signals of 149 mm, black mark signals of 2 mm and white signals of 5 mm from the leading end. The above-described adjusting procedure allows one to avoid overlapping or skipping in the reading ranges of two CCD's, thus enabling precise positioning with reference to the markers. The synthesized signals of a line obtained in this manner contain two signals corresponding to the markers as shown in FIG. 3 (d). The finally required image signal section (e) can be obtained by deleting unnecessary signal portions.

Now there will be given an explanation of a second method of adjusting the mounting positions of the image sensors, while making reference to FIG. 2.

This method allows the adjustment in the main scanning direction by means of electric signals. With respect to the positioning in the subsidiary scanning direction, the CCD's have to be adjusted as already explained. It is now assumed that the CCD's are already mechanically adjusted in the subsidiary scanning direction so as that they scan the same line, but the CCD 7' is mispositioned in the main scanning direction with respect to the CCD 7, causing overlapping readings of the image. Such erroneous alignment can be corrected electrically in the following manner, by means of the initial settings of shift registers 17, 7', microcomputer 18 and read-address counter 13 shown in FIG. 2. The shift registers 17, 17' store desired bit portions extracted from the digitized serial signals by gate circuits 19, 19' controlled by clock counters 20, 20' and release the stored signals in response to the instruction from the microcomputer 18. Said shift registers 17, 17' perform serial-to-parallel conversion with a unit of for example 8 bits, and are directly connected to a bus line 19 of the microcomputer 18 for achieving efficient parallel processing.

The amount of error in the position of the CCD 7' is unknown in the beginning. Consequently the digitized signals from the CCD 7' are read in succession by a unit of 8 bits from the beginning of the video signal section, and this procedure is repeated until data containing the black level signal corresponding to the marker 8' are detected by the microcomputer. Each signal reading of 8 bits corresponds to a length of 0.5 mm. In the case that the CCD 7' is erroneously displaced by 1 mm from the normal position toward the internal effective image area, the black level signal is detected in the 300th cycle due to said displacement of 1 mm, instead of 299th cycle as in the normal case. The amount of said erroneous displacement can thus be identified by counting the number of said data reading cycles with the microcomputer 18. Also a displacement equal to a fraction of a millimeter can be detected with a resolving power of 0.5 mm/8 bits by detecting where the black level signal starts within 8 bits.

The amount of displacement thus identified is stored in a memory RAM of the microcomputer 18. In the actual image reading operation, at the video signal readout from the memories M12, M22 etc., the number of bits, at the leading end of the output signals from the CCD 7', overlapping with the output signals from the CCD 7 is calculated from the number of bits of the aforementioned displacement already stored in the microcomputer 18. A readout starting address is set in the read-address counter 13 according to said calculation in order to initiate the signal readout from appropriate positions in said memories. Consequently the signal readout from the memory M11 or M21 is immediately followed by that from the memory M12 or M22 to obtain video signals of a complete line, eliminating image signal corresponding to a portion where the sensors overlap. As the CCD 7 is assumed to be in the correct position, the signal readout from the corresponding memory M11 or M21 does not require an adjustment of the starting address.

Figure 4A:
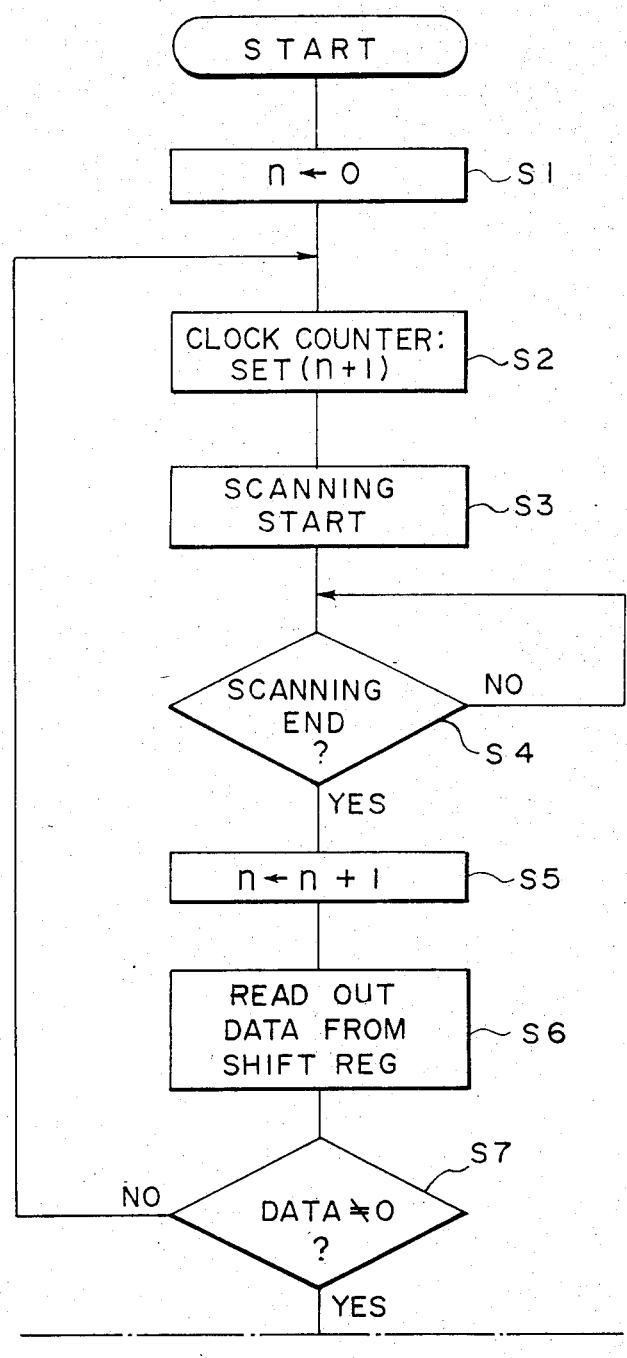
FIG. 4, composed of FIG. 4A and FIG. 4B, is a chart showing example of the control procedure.
Figure 4B:
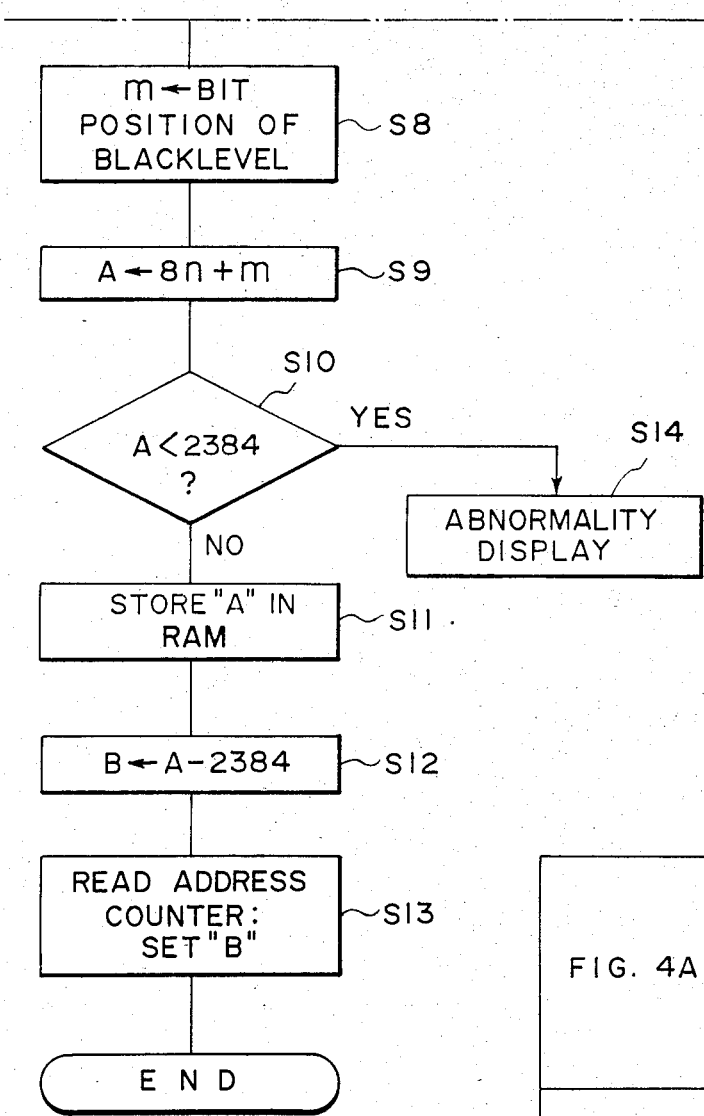
Figure 4:
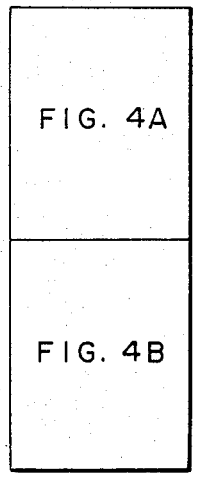

FIG. 4 is a flow chart indicating the procedure of correcting the positional error of the CCD 7' in the main scanning direction. The function of the circuit shown in FIG. 2 will now be clarified in detail by said flow chart shown in FIG. 4. The control program is stored in a read-only memory ROM of the microcomputer 18 and is executed by said microcomputer prior to the start of image scanning procedure.

At first, in response to an instruction to execute said program, the microcomputer 18 resets a counter n of the incorporated random access memory (step S1), sets "8" in the clock counter 20' (step S2) and initiates the scanning with the CCD 7' (step S3).

The clock counter 20' receives the driving clock pulses for the CCD 7' from a clock pulse generator 21 and initiates the counting operation simultaneously with the start of scanning. The clock counter 20' maintains the gate 19' open until the count of said counter reaches the value set in the step S2, thus supplying the digitized image signals from the binary encoding circuit 11' to the shift register 17'. When said count becomes equal to the set value, the gate 19' is closed to prohibit the further entry of image signals into the shift register 17'. Consequently, in the case that the clock counter 20' is set to "8", the shift register 17' stores image signals of 8 bits corresponding to the first eight pixels serially supplied from the CCD 17'.

When the completion of a scanning cycle is identified (step S4), the counter n of said random access memory is subjected to a stepwise increment (step S5), and the image signals of 8 bits stored in the shift register 17' are transferred to the random access memory through the line 19 (step S6) for identifying whether said signals are "0". As the black level is represented by "1" in the present embodiment, said 8-bit signals are not "0" if a black level is contained therein. Said signals are however identified as "0" in the absence of the black level, whereupon the program returns to the step S2 for executing the reading of the next 8 bits. Since n="1" in this state, the clock counter 20' stores "16", so that the shift register 17' stores image signals of 8 bits corresponding to 8 pixels from 9th to 16th supplied from the binary encoding circuit. Said signals are identified in the same manner as explained before, and, in the absence of black level, the reading and identification of 8-bit signals are repeated in the same manner.

When the microcomputer 18 identifies the presence of black level in the 8-bit signal stored in the shift register 17' in the course of the above-described repeated procedures, the bit position of said black level signal within said 8-bit signals is identifed and is set in the counter m of the random access memory (step S8).

Then a calculation 8+m is made by the contents of the counters n and m, and the result A of said calculation is retained (step S9) and compared with a determined value "2384" (step S10). Said value "2384" represents the minimum number of bits required for original reading when the CCD 17' is at the normal position. Consequently a result A of calculation smaller than said determined value indicates that the CCD 17' is unable to cover the required reading range and results in a skipping in the image reading. In such case an indication of abnormality is displayed on a display unit 22 to advise the operator that the aberration of the CCD 7' in the main scanning direction cannot be electrically corrected (step S14), and the subsequent image reading is suspended.

On the other hand, if said result A is equal to or larger than the determined value "2384", said value A is stored in a determined area of the random access memory (step S11), and said determined value "2384" is subtracted from the value A to obtain a result which is stored as the readout starting address B in the random access memory (step S12), and set in the read-address counter 13. In this manner the aberration of the reading range of the CCD 7' from the standard position is detected, and the overlapped reading with the CCD 17 is eliminated by cancelling the bits corresponding to said aberration. The detection of signal corresponding to the marker 8 and the determination of the readout starting address with respect to the CCD 7 can be achieved in the same manner.

In the foregoing it is assumed that the CCD 7 is already in the normal position while the CCD 7', is aberrated in the main scanning direction, but it will be evident that the aberration of the CCD 7 can be similarly corrected by means of the signal corresponding to the marker 8.

It is also possible to identify the reading range of the CCD 7 from the marker 8, to determine the reading width required for the CCD 7' from the result of said identification, and to determine the readout starting address B for the CCD 7' in relation to the signal corresponding to the marker 8' in such a manner that said reading width is shared by the CCD 7'.

The above-described adjusting method allows automatic electric correction of the aberration in the main scanning direction by means of the black level signals corresponding to the markers 8, 8' and also allows the adjustment of the CCD's in the subsidiary scanning direction with a simple operation.

In the foregoing embodiment two image sensors are arranged along the main scanning direction. In the case that three or more image sensors are employed, it is preferable to have, in addition to the aforementioned markers on both sides, conventional markers in the areas where the central CCD overlaps with the lateral CCD's (in the case of three CCD's). Also the present invention is applicable not only to an apparatus utilizing reflected light as explained before but also to an apparatus utilizing transmitted light.

Also the markers may be provided either outside the subsidiary scanning range (8, 8' in FIG. 1) or inside the subsidiary scanning range (9, 9' in FIG. 1).

In the foregoing embodiment the original reading is achieved by the movement of the optical unit, but the present invention is applicable also to a structure in which the optical unit is fixed while the original is rendered movable.

The present invention is by no means limited by the foregoing embodiment but is subject to various modifications within the scope of the appended claims.

As explained in the foregoing, the present invention is featured by the use of at least a marker which is provided on each outside margin of the main scanning range and aligned on a same main scanning direction, wherein the signals corresponding to said markers allow the adjustment of the positions of plural image sensors in the main and subsidiary scanning directions under the observation of the wave form on a synchroscope, and even an automatic electric adjustment in the main scanning direction, thus enabling rapid and precise adjustment through a simple operation without requiring practice. In this manner the present invention enables, in an image reading apparatus with plural image sensors, an improvement in the precision of the mounting of the image sensors with a simplified adjusting procedure.

What I claim is:

1. An image reading apparatus comprising:

plural image sensors for scanning an original image on a line by line basis, said plural image sensors being arranged to scan an overlapping portion of the original image;

plural markers provided at both ends, with respect to a scanning direction of said plural image sensors, in an effective scanning area to be scanned by said sensors;

detecting means for detecting the amount of overlapping portion scanned by said plural image sensors in accordance with signals generated from said plural image sensors, respectively, through scanning of said plural markers; and eliminating means for eliminating image signal corresponding to the overlapping portion from image signals generated from said plural image sensors, respectively, through scanning of the original image, in accordance with the amount of overlapping portion detected by said detecting means.

2. An image reading apparatus according to claim 1, wherein said markers are provided on the lower face of an original carriage supporting the original.

3. An image reading apparatus according to claim 1, further comprising memory means for storing the image signals generated from said plural image sensors, wherein said eliminating means is adapted to control read-out of the image signal from said memory means.

4. An image reading apparatus according to claim 1, wherein said detecting means is arranged to detect the amount of overlapping portion based on the sensing of the positions of said plural markers by said plural image sensors.

5. An image reading apparatus according to claim 1, wherein said plural image sensors are arranged along a principal scanning direction.

6. An image reading apparatus according to claim 1, wherein said plural image sensors are adapted to scan the entire area of said original image by relative movement of an original and said sensors.

* * * * *